United States Patent

[11] 3,617,308

[72] Inventor Hendrik Albertus Graffelman
 Papendrecht, Netherlands
[21] Appl. No. 649,099
[22] Filed June 27, 1967
[45] Patented Nov. 2, 1971
[73] Assignee Lever Brothers Company
 New York, N.Y.
[32] Priority June 28, 1966
[33] Great Britain
[31] 28,917/66

[54] MARGARINE FAT AND PROCESS FOR PREPARING A SPREAD
 4 Claims, No Drawings
[52] U.S. Cl. ..................................... 99/118, 99/122
[51] Int. Cl. ..................................... A23d 3/10
[50] Field of Search ............................ 99/118, 122, 123

[56] References Cited
 UNITED STATES PATENTS
2,890,959 6/1959 Phillips.......................... 99/123
3,210,197 10/1965 Galenkamp.................. 99/122
3,353,964 11/1967 Seiden........................ 99/118

Primary Examiner—Joseph M. Golian
Attorney—Louis F. Kline, Jr.

ABSTRACT: This invention provides edible fat products, especially margarines and spreads comprising a blend of a hard fat with a higher proportion of liquid vegetable oil, wherein the hard fat amounts to 8 to 15 percent, preferably 8 to 12 percent, by weight of the total composition and is composed of the random interesterification product of a mixture of hardened vegetable oil with a slip melting point not less than 50° C. and free from significant proportions of combined fatty acid having less than 16 carbon atoms, with fully hardened palm kernel oil in the ratio of 25-75:75-25, preferably about 40:60, parts by weight, and the liquid vegetable oil is one containing at least 40 percent of linoleic acid and in which the proportion of saturated to unsaturated acids is not greater than 1:2. The invention also includes processes for preparing such products.

MARGARINE FAT AND PROCESS FOR PREPARING A SPREAD

This invention relates to a process for preparing an edible fat product, especially a margarine or like product for spreading on bread, having a high content of polyunsaturated fatty acids, and to products so prepared.

Such products are nowadays of particular interest since a high ratio of polyunsaturated fatty acids, especially the so-called "essential fatty acid," to saturated fatty acids is thought to be dietically advantageous. It is very advantageous for such products to have the physical properties which render them easily spreadable at relatively low temperatures without being oily at room temperatures, as well as being thin melting on the tongue and this condition sets a limit to the content of liquid oil in the composition. In such products the polyunsaturated fatty acids are introduced in the form of liquid oils containing the glycerides of these acids and it is difficult to obtain a sufficient proportion of such acids without raising the liquid oil content to such a level that the desired physical properties are not obtained.

It is an important object of the present invention to provide an edible fat product which can be used as such or in margarine production and which combines the physical properties referred to above, with a high content of essential fatty acids, e.g. 30 to 60 percent. The consistency of these products, which will normally be marketed in tins or tubs, is dependent on the solids content of the fat phase at different temperatures. (The solids content can be determined from the dilation as described in Journal of the American Oil Chemists' Society, (1954) Vol. 31, pages 98 to 103.) For a product with the desired consistency at room temperatures, say from 15° to 25° C., the dilatations in this range should be not less than about 100 and preferably not greater than about 200, determined as described in British patent specification No. 827,172. Somewhat higher dilatation values, say of about 250, in the range of 15° to 25° C., still give spreadable products in general, but in this particular case the product then becomes not palatable at body temperatures or else it cannot contain the relatively high amounts of polyunsaturated acids aimed at.

Products with a high content of essential fatty acids can be made by using a completely hardened oil as the hard fat ingredient of the edible fat together with a relatively high proportion of oils of high essential fatty acid content but such products suffer from an undesirably high proportion of saturated to unsaturated acids or exhibit very inferior melting and eating properties. They either have unsuitable consistency, for instance oiliness or undue hardness or do not melt quickly in the mouth.

It has been proposed to use as the hard fat in such products a glyceride mixture obtained by randomly interesterifying hardened palm kernel oil alone or in admixture with a small proportion e.g. 10 percent of the mixture by weight) of hardened palm oil. These interesterification products were said to contain a considerable proportion, some 35 percent by weight, of a fatty oil (composed mainly of glycerides of lauric acid) which was substantially liquid at 20° C. In order to obtain the solids content required in the fat phase of a margarine, using such an interesterification product in conjunction with a polyunsaturated liquid oil it was necessary either to fractionate the interesterification product so as to remove the said lauric acid-containing oil and then to employ at least 15 percent of the remaining upper melting fraction in the mixture thereof with the polyunsaturated oil, or to employ the interesterification product without fractionation in a still greater proportion, e.g. some 30 percent. Both alternatives are disadvantages. A fractionation step is an added expense and complication especially as to carry it out efficiently needs the use of volatile solvents. And the necessity, if such a step be omitted of using such high proportions of the interesterification product in the margarine fat means that a lower proportion of polyunsaturated oil must be used with a corresponding reduction in the amount of essential fatty acid introduced and in the ratio of unsaturated to saturated acid in the product.

Replacement of the palm kernel fat by other hardened oils is unsatisfactory in that it gives products in which the curve of dilatation against temperature levels off at temperatures in the upper part of the pertinent range. Hence the dilatations at temperatures higher than 20° C. are too high, the product therefore being thick melting in the mouth. On the other hand if a mixture of nonintersterified completely hardened palm kernel oil and noninteresterified hardened oils were used the product would necessarily contain relatively high proportions of tristearins and tripalmitins, which have too high melting points to be palatable. The same applies to the use of stearin fractions, such as palmstearins, which all lead to a margarine which is thick melting in the mouth.

It has now been found that by randomly interesterifying a mixture of 25 to 75 percent of completely hardened palm kernel oil and 75 to 25 percent of a specific kind of other hardened oil an interesterification product is obtained which, in admixture with polyunsaturated oils, shows a significantly different behavior from the interesterification product referred to above in that, in proportions of 8 to 15 percent in the mixture with the unsaturated oil, it gives fatty products having the desired consistency, being easily spreadable at relatively low temperatures without being oily at room temperatures and which have desirable eating properties, including that of being thin melting on the tongue. The fatty products of the invention therefore, comprise blends of these interesterification products with a liquid oil containing at least 40 percent of linoleic acid and the interesterification products amounting to 8 to 15 percent and preferably 8 to 12 percent of the blend. The specific kind of other hardened oil referred to is one having a melting point not less than 50° C. and free from significant proportions of fatty acid having less than 16 carbon atoms. (By "melting point" herein is meant the slipping point, defined in Bailey, Melting and Solidification of Fats, 1950, page 110). The ratio of saturated fatty acids to unsaturated fatty acids in the product will be not greater than 1:2 and may (with advantage) be considerably less, e.g. less than 1:3.

The products of the invention may be filled in liquid condition into tubs for sale therein without it being necessary to apply specific cooling measures. Using in the interesterification reaction a typical palm kernel oil and a typical palm oil, the fatty acid composition of the interesterification products obtained when the proportion of palm kernel oil is 25 and 75 percent respectively are shown below:

| Palm Kernel: Palm oil | 25:75 | |
|---|---|---|
| $C_8$ to $C_{10}$ acids | 1.5% | 4.0% |
| Lauric acid | 11% | 33% |
| Myristic acid | 6.5% | 12% |
| Palmitic acid | 35% | 17% |
| Stearic acid | 46% | 29% |

Among liquid vegetable oils containing the desired high proportions of essential fatty acid, especially linoleic acid are: safflower oil, sunflower oil, soybean oil, maize oil, wheat germ oil and linseed oil as well as mixtures and fractions of these oils containing at least 40 percent of linoleic acid. Also cottonseed oil can be used but preference is given to those oils which contain besides a high amount of essential acid only low amounts of saturated acids, (less than about 15 percent). The palm kernel oil is hardened to iodine values not greater than 3. Among the other hardened fats of melting point above 50° C. to be used are: palm oil hardened to a melting point in the range of 55°–60° C., and rapeseed oil, cottonseed oil and soybean oil hardened to a melting point in the range of 55°–65° C. The amount of palm kernel fat in the blend to be interesterified is suitably chosen between 40 and 60 percent, the amount of the interesterified blend in the total fat being preferably within the range 8 to 12 percent and especially 9 to 12 percent.

In the preparation of the hard fat ingredient the interesterification and hardening steps may be reversed in order and the components may be hardened separately or in combination. The employment of the interesterified fat blend specified enables product to be made of which the dilatation in the temperature range 15°–25° C. lies between about 200 and about 100. In this way products are obtained with good spreadability properties without oiliness at room temperature. The dilatation at 35° C. will be below 50, so that the product easily melts in the mouth. In addition a relatively high proportion of essential fatty acids is present.

In making margarines or other foods which are plastic fat/water emulsions the edible fat mixtures obtained as described above can be emulsified in the usual way with an aqueous phase at a temperature at which they are liquid and then subjected to rapid chilling, using for instance, apparatus of conventional kind comprising one or more scraped surface tubular heat exchangers, for instance "Votator" apparatus and working up the emulsion to form a water-in-oil emulsion of suitable consistency for spreading. The initially liquid fat mixture may, before or after emulsification, be subjected to a crystallizing step before the rapid chilling and further crystallization may be effected, for instance in resting units such as Votator B-units, before filling the plastic emulsion into containers and between such resting units and the filling device the product may be worked mechanically. On the other hand, when the product is to be filled in liquid form postcrystallization and working may well be omitted, the product passing direct from a Votator A-unit or the like to the filling device.

Examples 1, 2, 5 and 6 below illustrate the invention, while Examples 3 and 4 show comparable processes outside the invention.

EXAMPLE I

Palm kernel oil was hardened in a conventional way at 160° C., using a suspension of 0.2 percent nickel catalyst based on the weight of oil, until the iodine value was below 1. The nickel was removed by filtration and the hardened product was mixed with its own weight of palm oil hardened under the same conditions to a melting point of 58° C. and an iodine value below 1. The palm kernel fat had a melting point of 39 C. The mixture was randomly interesterified using as a catalyst 0.2 percent based on the weight of oil of sodium ethoxide at a temperature of about 80° C. After residual catalyst had been destroyed by addition of water the fat was recovered and washed. The mixture had a melting point of 44° C. and the following dilatations:

$D_{15}$ ---- 1,800
$D_{20}$ ---- 1,825
$D_{25}$ ---- 1,725
$D_{30}$ ---- 1,540
$D_{35}$ ---- 1,180
$D_{40}$ ---- 645
$D_{45}$ ---- 220
$D_{50}$ ---- 0

It was mixed with sunflower oil in a proportion of 12 : 88. The mixture so obtained was melted and emulsified with an aqueous phase prepared from soured milk, to give an emulsion containing 84 percent of fat. The emulsion was chilled by passage through a closed scraped-surface tubular heat exchanger and then filled into tins. The margarine had the following dilatations:

$D_{15}$ ---- 205
$D_{20}$ ---- 170
$D_{25}$ ---- 125
$D_{30}$ ---- 75
$D_{35}$ ---- 20
$D_{40}$ ---- 0

It was thin melting on the tongue.

EXAMPLE II

Example 1 was repeated, except that the hard fat mixture was made from 40 percent of completely hardened palm kernel fat and 60 percent of completely hardened rapeseed oil with a melting point of 60° C. The iodine value of both fats was below 1. The mixture was interesterified in the way described above. It showed the following dilatations:

$D_{15}$ ---- 2,020
$D_{20}$ ---- 2,040
$D_{25}$ ---- 1,980
$D_{30}$ ---- 1,760
$D_{35}$ ---- 1,480
$D_{40}$ ---- 1,050
$D_{45}$ ---- 500
$D_{50}$ ---- 30

A blend was made from this fat and safflower oil, in proportions of 11:89. The margarine made from this fatty phase had the following dilatations:

$D_{15}$ ---- 210
$D_{20}$ ---- 180
$D_{25}$ ---- 140
$D_{30}$ ---- 90
$D_{35}$ ---- 40
$D_{40}$ ---- 0

It was thin melting on the tongue to about the same extent as the product of example 1.

In both Examples the ratio of saturated to polyunsaturated acid was 0.3.

EXAMPLE III

Example 1 was repeated except that the interesterification step was omitted. The final product had the following dilatation values:

$D_{15}$ ---- 210
$D_{20}$ ---- 180
$D_{25}$ ---- 160
$D_{30}$ ---- 140
$D_{35}$ ---- 120
$D_{40}$ ---- 70

It was much thicker melting on the tongue than the products of examples 1 and 2.

EXAMPLE IV

A composition was made which did not contain the fat according to the invention. Instead of this, 10 parts of completely hardened palm oil, with a melting point of 58° C. were mixed with 90 parts sunflower oil. The margarine obtained was unsatisfactory, as appears from the following dilatation values:

$D_{15}$ ---- 275
$D_{20}$ ---- 280
$D_{25}$ ---- 280
$D_{30}$ ---- 270
$D_{35}$ ---- 250
$D_{40}$ ---- 40
$D_{45}$ ---- 85

In another trial the hard fat component was composed of 11 parts palm oil stearine, which was obtained by fractionating palm oil, e.g. with acetone, and removing 70 percent as liquid fraction. The melting point of this stearine was 54° C. The margarine obtained had the following dilatation values:

$D_{15}$ ---- 210
$D_{20}$ ---- 200
$D_{25}$ ---- 175
$D_{30}$ ---- 155
$D_{35}$ ---- 125
$D_{40}$ ---- 60
$D_{45}$ ---- 0

This margarine did not melt satisfactorily in the mouth. It was even thicker melting than the product of example 3.

EXAMPLE V

Example 1 was repeated except that the hard fat mixture was made from 15 percent completely hardened palm kernel fat and 15 percent completely hardened cottonseed oil with a melting point of 60° C. This mixture was interesterified in the way described above and showed the following dilatations:

| | |
|---|---|
| $D_{15}$ | 1,890 |
| $D_{20}$ | 1,855 |
| $D_{25}$ | 1,745 |
| $D_{30}$ | 1,565 |
| $D_{35}$ | 1,205 |
| $D_{40}$ | 725 |
| $D_{45}$ | 250 |
| $D_{50}$ | 40 |

A blend was made from this fat and sunflower oil in proportions of 10:90. A margarine made from this fatty phase had the following dilatations:

| | |
|---|---|
| $D_{15}$ | 180 |
| $D_{20}$ | 150 |
| $D_{25}$ | 115 |
| $D_{30}$ | 80 |
| $D_{35}$ | 45 |
| $D_{40}$ | 10 |

It was thin melting on the tongue. The ratio saturated acids to polyunsaturated acids was about 0.3.

EXAMPLE VI

Example 1 was repeated except that the hard fat mixture was made from 50 percent completely hardened palm kernel fat and 50 percent completely hardened soybean oil with a melting point of 60° C. This mixture was interesterified in the way described above and showed the following dilatations:

| | |
|---|---|
| $D_{15}$ | 1,865 |
| $D_{20}$ | 1,800 |
| $D_{25}$ | 1,700 |
| $D_{30}$ | 1,515 |
| $D_{35}$ | 1,190 |
| $D_{40}$ | 765 |
| $D_{45}$ | 415 |
| $D_{50}$ | 40 |

A blend was made from this fat and sunflower oil in proportions of 10:90. The margarine made from this fatty phase had the following dilatations:

| | |
|---|---|
| $D_{15}$ | 185 |
| $D_{20}$ | 145 |
| $D_{25}$ | 120 |
| $D_{30}$ | 90 |
| $D_{35}$ | 45 |
| $D_{40}$ | 15 |

It was thin melting on the tongue. The ratio of saturated to polyunsaturated acids was about 0.3.

By an essential fatty acid in this specification is meant an acid from the group consisting of linoleic, linolenic and arachidonic acids. Of these linoleic is the most important and preferably the major part or even all the essential fatty acid in the liquid oils used in the invention may be linoleic. As indicated above the liquid oil used contains at least 40 percent of linoleic acid.

I claim:

1. Process for preparing an edible fat product having a high content of polyunsaturated fatty acids of vegetable oils, which comprises randomly interesterifying a mixture of fully hardened palm kernel oil with fully hardened vegetable oil of slip melting point not less than 50° C. and free from significant proportions of combined fatty acids having less than 16 carbon atoms, said fully hardened palm kernel oil and fully hardened vegetable oil being present in weight ratios between about 25:75 and about 75:25, and blending the interesterification product with a liquid vegetable oil which contains at least 40 percent of linoleic acids and in which the proportion of saturated to unsaturated acids is not greater than 1:2 by weight, in such proportions that 8 to 15 percent by weight of the interesterification product is present in said blend.

2. Process according to claim 1, wherein the blending is so effected that the proportion of hard fat amounts to 8 to 12 percent of the total fat.

3. Process according to claim 1 for preparing a margarine or spread including the further steps of emulsifying said blend with aqueous phase and chilling and working up the emulsion in such a way as to obtain a water-in-oil emulsion of consistency suitable for spreading on bread.

4. Process according to claim 2 for preparing a margarine or spread including the further steps of emulsifying said blend with an aqueous phase and chilling and working up the emulsion in such a way as to obtain a water-in-oil emulsion of consistency suitable for spreading on bread.

* * * * *